US012811163B2

(12) United States Patent
Fortini et al.

(10) Patent No.: US 12,811,163 B2
(45) Date of Patent: Nov. 24, 2026

(54) MANUFACTURING MACHINE AND METHOD TO MANUFACTURE A CYLINDRICAL BATTERY

(71) Applicant: G.D S.p.A., Bologna (IT)

(72) Inventors: Massimo Fortini, Bologna (IT); Giacomo Noferini, Bologna (IT); Giuliano Gamberini, Bologna (IT)

(73) Assignee: G.D S.p.A., Bologna (IT)

( * ) Notice: Subject to any disclaimer, the term of this patent is extended or adjusted under 35 U.S.C. 154(b) by 390 days.

(21) Appl. No.: 18/720,083

(22) PCT Filed: Dec. 13, 2022

(86) PCT No.: PCT/IB2022/062121

§ 371 (c)(1),
(2) Date: Jun. 14, 2024

(87) PCT Pub. No.: WO2023/111834

PCT Pub. Date: Jun. 22, 2023

(65) Prior Publication Data

US 2025/0062368 A1 Feb. 20, 2025

(30) Foreign Application Priority Data

Dec. 15, 2021 (IT) ........................ 102021000031478

(51) Int. Cl.
*H01M 6/00* (2006.01)
*H01M 10/04* (2006.01)
(Continued)

(52) U.S. Cl.
CPC ....... *H01M 6/005* (2013.01); *H01M 10/0404* (2013.01); *H01M 10/0422* (2013.01); *H01M 50/107* (2021.01); *H01M 50/152* (2021.01)

(58) Field of Classification Search
CPC .. H01M 6/005; H01M 50/107; H01M 50/152; H01M 10/0404; H01M 10/0422
See application file for complete search history.

(56) References Cited

U.S. PATENT DOCUMENTS 4,502,213 A 3/1985 Madden et al.
11,177,511 B2 * 11/2021 Meier .................. H01M 10/16

FOREIGN PATENT DOCUMENTS

WO 2009027791 A2 3/2009

OTHER PUBLICATIONS

ISR and Written Opinion received in connection with International Application Serial No. PCT/IB2022/062121 dated Mar. 30, 2023, 13 pages.

* cited by examiner

*Primary Examiner* — Mayla Gonzalez Ramos
(74) *Attorney, Agent, or Firm* — Levenfeld Pearlstein, LLC

(57) ABSTRACT

Manufacturing machine to manufacture a cylindrical battery having a cylindrical case which is closed at the top by a lid. There are provided: a first processing drum, mounted to rotate around a first rotation axis, a first seat to support the cylindrical case; a deformation unit, to create an annular groove on a side wall of the cylindrical case; a second processing drum, arranged downstream of the first processing drum and mounted so as to rotate around a second rotation axis, a second seat designed to support the cylindrical case; a feeding unit, to feed the lid on top of the cylindrical case supported by the second seat; a third processing drum, arranged downstream of the second processing drum (31), a third seat (48) to support the cylindrical case; and a bending unit, configured to bend a rim of the cylindrical case against the lid.

20 Claims, 12 Drawing Sheets

(51) Int. Cl.
*H01M 50/107* (2021.01)
*H01M 50/152* (2021.01)

MANUFACTURING MACHINE AND METHOD TO MANUFACTURE A CYLINDRICAL BATTERY

CROSS-REFERENCE TO RELATED APPLICATION DATA

This application is a U.S. National Stage Application of International Application No. PCT/IB2022/062121, filed Dec. 13, 2022, which claims the benefit of and priority to Italian Patent Application No. 102021000031478, filed Dec. 22, 2021, the disclosure of each is incorporated herein in its entirety.

FIELD OF THE ART

The present invention relates to a manufacturing machine and a method to manufacture a cylindrical battery.

The present invention finds advantageous application to the production of a lithium-ion cylindrical battery, to which the following description will explicitly refer without loss of generality.

BACKGROUND OF THE INVENTION

Commercial lithium-ion batteries are assembled in three different geometries: cylindrical, prismatic and bag-like.

The cylindrical batteries are formed by a cylindrical metal case with inside a single electrochemical cell, formed by an anode, separator and cathode which are wound together around a central pin.

In particular, the cylindrical case is initially open on one side (i.e. it has the shape of a cup having a closed lower end and an open upper end) to allow the insertion of the wound electrochemical cell and of the electrolyte that impregnates the wound electrochemical cell; once the formation of the battery has been completed (i.e. once all the components have been arranged inside the cylindrical case), the open end of the cylindrical case is closed creating a sealed closure.

In particular, in order to close the open end of a cylindrical case, a circular lid (possibly coupled to an annular gasket) is used and is connected to the cylindrical case, deforming against the lid an upper rim of the cylindrical case itself.

SUMMARY

An aim of the present invention is to provide a manufacturing machine and a method to manufacture a cylindrical battery that allow it to operate at a high production speed (measured as cylindrical batteries produced in the unit of time) while ensuring compliance with a high quality of the final product.

In accordance with an aspect of the present invention there is provided a manufacturing machine to manufacture a cylindrical battery comprising a cylindrical case which houses an electrochemical cell and is closed at the top by a lid; the manufacturing machine comprises:

a first processing drum, which is mounted so as to rotate around a first rotation axis in order to move forward, along a first processing path, a first seat designed to support the cylindrical case;

a deformation unit, which is arranged along the first processing path and is configured to create an annular groove on a side wall of the cylindrical case;

a second processing drum, which is arranged downstream of the first processing drum and is mounted so as to rotate around a second rotation axis in order to move forward, along a second processing path, a second seat designed to support the cylindrical case;

a feeding unit, which is configured to feed the lid on top of the cylindrical case supported by the second seat;

a third processing drum, which is arranged downstream of the second processing drum and is mounted so as to rotate around a third rotation axis in order to move forward, along a third processing path, a third seat designed to support the cylindrical case; and a first bending unit, which is arranged along the third processing path and is configured to bend a rim of the cylindrical case against the lid.

Preferably, the manufacturing machine comprises a second bending unit, which is arranged along the second processing path and is configured to bend only partially the rim of the cylindrical case towards the lid.

Preferably, the manufacturing machine comprises a compression unit, which is arranged downstream of the first bending unit and is configured to axially compress the cylindrical case so as to plastically deform the groove.

Preferably, the feeding unit is configured to feed together the lid and a gasket on top of the cylindrical case supported by the second seat.

Preferably, the feeding unit comprises:

a holding head, which is designed to hold the lid;

a feeding drum, which is arranged at the side of the second processing drum, wherein the feeding drum is mounted so as to rotate around a fourth rotation axis and supports the holding head with the interposition of a hinged arm.

Preferably, the machine comprises a transfer drum which is mounted so as to rotate around a fifth rotation axis, wherein the transfer drum is interposed between the first processing drum and the second processing drum and is configured to transfer the cylindrical case from the first processing drum to the second processing drum.

Preferably, the second processing drum is configured to directly transfer the cylindrical case to the third processing drum.

Preferably, the deformation unit is configured to rotate together with the first processing drum in an integral manner.

Preferably, the deformation unit comprises:

a first support body, which is axially aligned with the first seat and is mounted so as to rotate around a sixth rotation axis, which is parallel to the first rotation axis; and a plurality of deforming discs, which are designed to deform the side wall of the cylindrical case in order to create the annular groove, are mounted on the first support body so as to form a circle at the centre of which the cylindrical case, in use, is placed at the centre, and are radially movable so as to radially get close to and move away from the cylindrical case which is located, in use, between them.

Preferably, each deforming disc is mounted on the first support body in a rotary manner so as to rotate around a seventh rotation axis, which is parallel to the sixth rotation axis.

Preferably, each deforming disc is mounted in an idle manner so as to freely rotate around the seventh rotation axis.

Preferably, each deforming disc is mounted in an eccentric manner relative to the seventh rotation axis so as to radially move during its rotation around the seventh rotation axis.

Preferably, the manufacturing machine comprises a first lifting device, which is axially movable and is configured to extract the cylindrical case from the first seat by coupling the cylindrical case to the deformation unit and to insert the cylindrical case again into the first seat by uncoupling the cylindrical case from the deformation unit.

Preferably, in the middle of the first support body there is a first central abutting element, which is integral to the first processing drum and, hence, does not rotate with the first support body and against which the cylindrical case that is coupled to the deformation unit is pushed. Preferably, each bending unit is mounted on the corresponding processing drum so as to rotate together with the corresponding processing drum in an integral manner.

Preferably, each bending unit comprises:

a second support body arranged in axial alignment with the corresponding seat and rotatably mounted so as to rotate around an eighth rotation axis, which is parallel to the rotation axis of the corresponding processing drum; and a plurality of bending discs, which are designed to bend the rim of the side wall of the cylindrical case, are mounted on the second support body so as to form a circle at the centre of which the cylindrical case, in use, is placed and are radially movable to radially get close to and move away from the cylindrical case which is located, in use, between them.

Preferably, each bending disc is mounted on the second support body in a rotary manner so as to rotate around a ninth rotation axis which is parallel to the eighth rotation axis.

Preferably, each bending disc is mounted in an idle manner so as to freely rotate around the ninth rotation axis.

Preferably, each bending disc is mounted in an eccentric manner relative to the ninth rotation axis so as to radially move during its rotation around the ninth rotation axis.

Preferably, the manufacturing machine comprises a second lifting device, which is axially movable and is configured to extract the cylindrical case from the corresponding seat by coupling the cylindrical case to the bending unit and to insert the cylindrical case again into the corresponding seat by uncoupling the cylindrical case from the bending unit.

Preferably, in the middle of the second support body there is a second central abutting element, which is integral to the corresponding processing drum and, hence, does not rotate with the second support body and against which the cylindrical case that is coupled to the bending unit is pushed.

Preferably, the first, the second and third processing drum rotate with a continuous law of motion around the corresponding rotation axes.

In accordance with a further aspect of the present invention there is provided a method to manufacture a cylindrical battery comprising a cylindrical case which houses an electrochemical cell and is closed at the top by a lid; the method to manufacture comprises the steps of:

moving forward, by means of a first processing drum mounted so as to rotate around a first rotation axis, along a first processing path a first seat designed to support the cylindrical case;

creating, by means of a deformation unit arranged along the first processing path, an annular groove on a side wall of the cylindrical case;

moving forward, by means of a second processing drum arranged downstream of the first processing drum and mounted so as to rotate around a second rotation axis, along a second processing path a second seat designed to support the cylindrical case;

feeding, by means of a feeding unit, the lid on top of the cylindrical case supported by the second seat;

moving forward, by means of a third processing drum arranged downstream of the second processing drum and mounted so as to rotate around a third rotation axis, along a third processing path a third seat designed to support the cylindrical case; and bending, by means of a bending unit arranged along the third processing path, a rim of the cylindrical case against the lid.

The claims describe embodiments of the present invention forming an integral part of the present disclosure.

BRIEF DESCRIPTION OF THE DRAWINGS

The present invention will now be described with reference to the accompanying drawings, which illustrate a non-limiting embodiment thereof, wherein.

DETAILED DESCRIPTION

Figure 1:
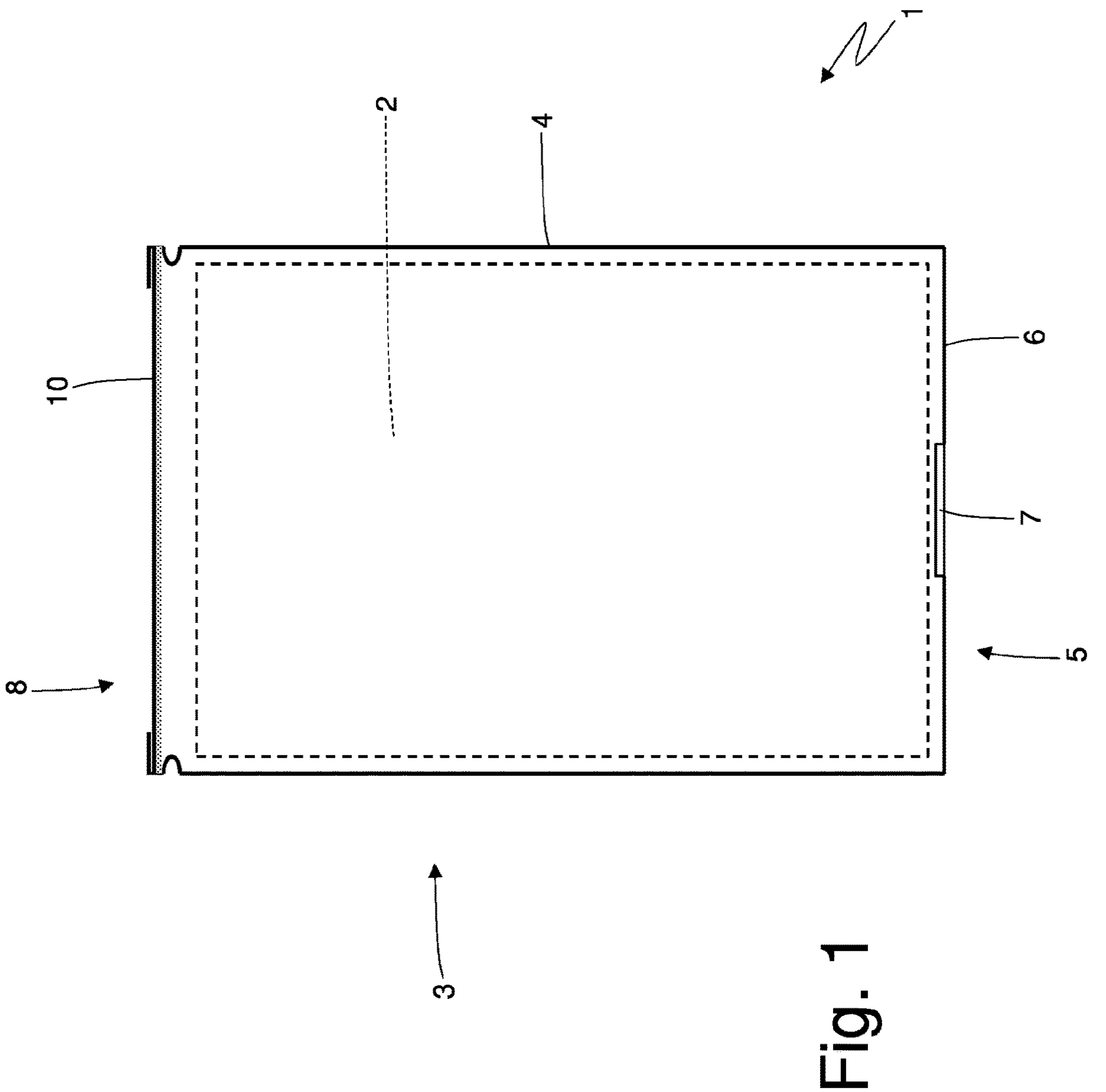
FIG. 1 is a schematic view of a cylindrical battery.

In FIG. 1 number 1 denotes a cylindrical battery for electrical energy as a whole.

The cylindrical battery 1 comprises an electrochemical cell 2 of the "jelly-roll" or "Swiss-roll" type formed by several sheets wound together so as to take a cylindrical shape and a cylindrical case 3 that encloses the electrochemical cell 2 in its inside.

The cylindrical case 3 has a cylindrical side wall 4, a lower end 5 which is closed from the beginning by a lower wall 6 which is seamlessly connected to the side wall 4 and supports (with adequate electrical insulation) a negative pole 7, and an upper end 8 which is opposite to the lower end 5, is initially open to allow the insertion of the electrochemical cell 2, subsequently is closed and sealed.

Figure 2:
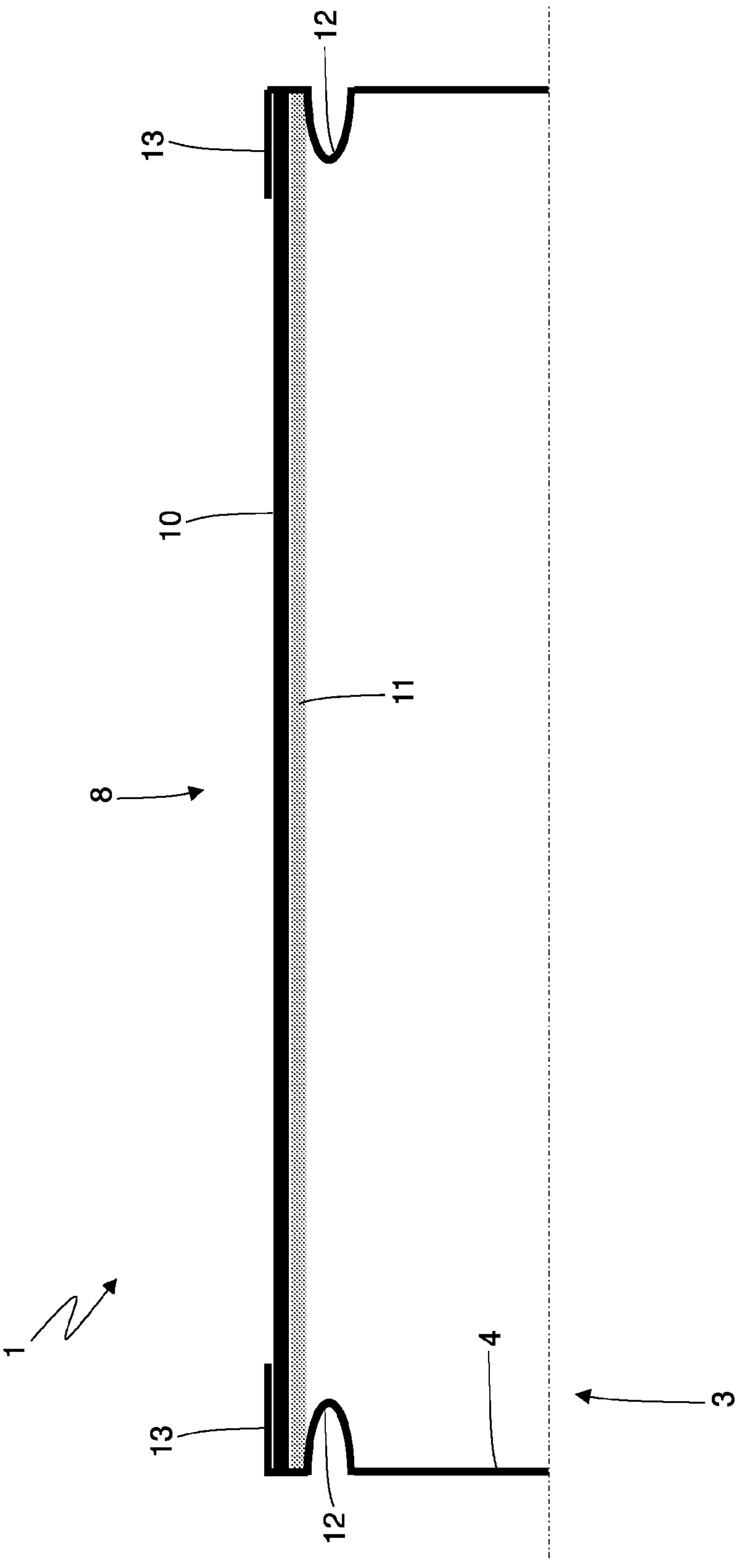
FIG. 2 is a schematic view on enlarged scale of an upper end of the cylindrical battery of FIG. 1.

As better illustrated in FIG. 2, at the upper end 8 of the cylindrical case 3 a circular lid 10 is arranged, which forms the closure of the upper end 8 (i.e. it constitutes an upper base of the cylindrical case 3). An annular gasket 11, which is interposed between the lid 8 and the side wall 4 of the cylindrical case 3, is coupled to the lid 10. In particular, the assembly of the lid 10 and of the annular gasket 11 is clamped between an annular groove 12 obtained (by deformation) in the side wall 4 and a rim 13 of the side wall 4 that has been deformed against the lid 10.

With reference to FIGS. 3-8, the ways of closing the open upper end 8 of the cylindrical case 3 are described below.

Figure 3:
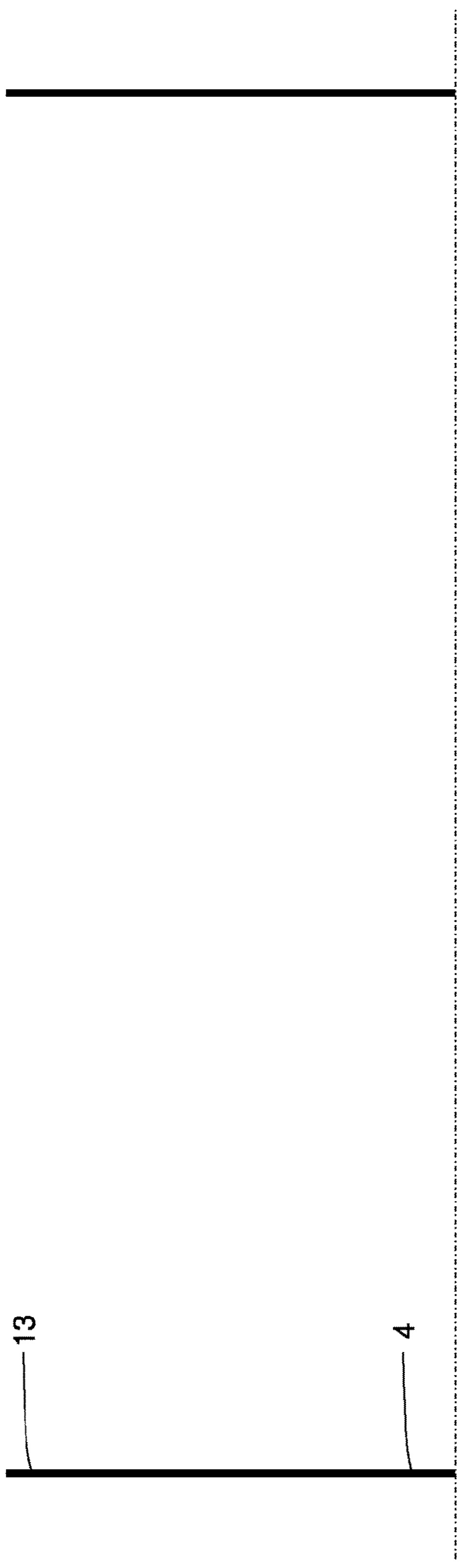
FIGS. 3-8 schematically illustrate a series of operations to close at the top a cylindrical case of the cylindrical battery of FIG. 1.

As illustrated in FIG. 3, initially the side wall 4 of the cylindrical case 3 is perfectly cylindrical (also at the rim 13) without any deformation whatsoever to allow an easy insertion of the electrochemical cell 2.

Figure 4:
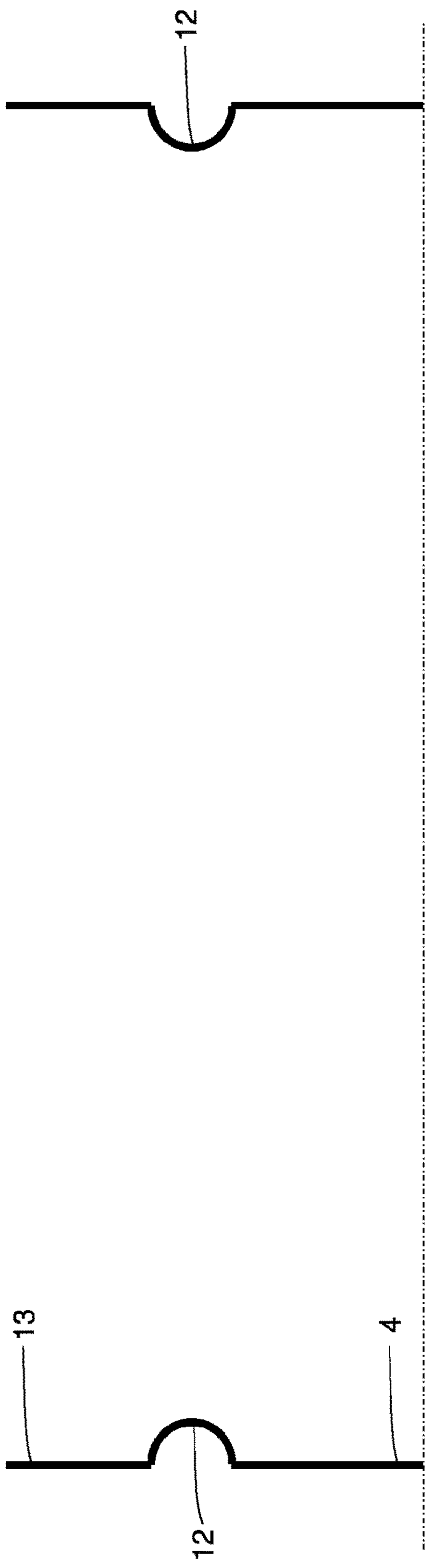

As illustrated in FIG. 4, once the electrochemical cell 2 is inserted into the cylindrical case 3, the side wall 4 of the cylindrical case 3 (below the rim 13) is plastically deformed to create the annular groove 12.

Figure 5:
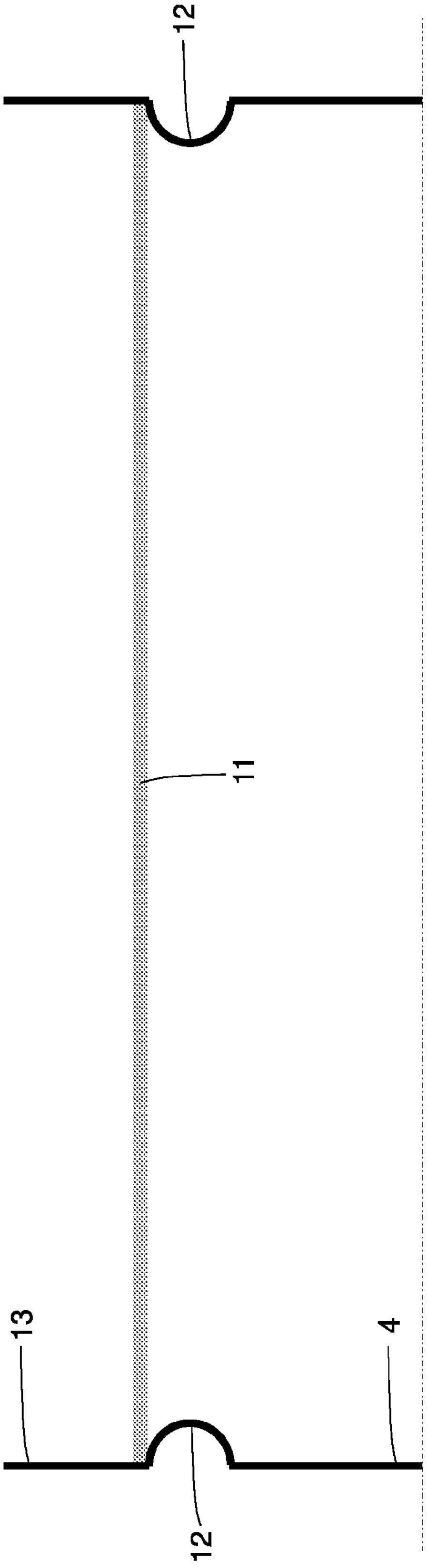

As illustrated in FIG. 5, the gasket 11 is subsequently placed on the annular groove 12 (which constitutes a rest base).

Figure 6:
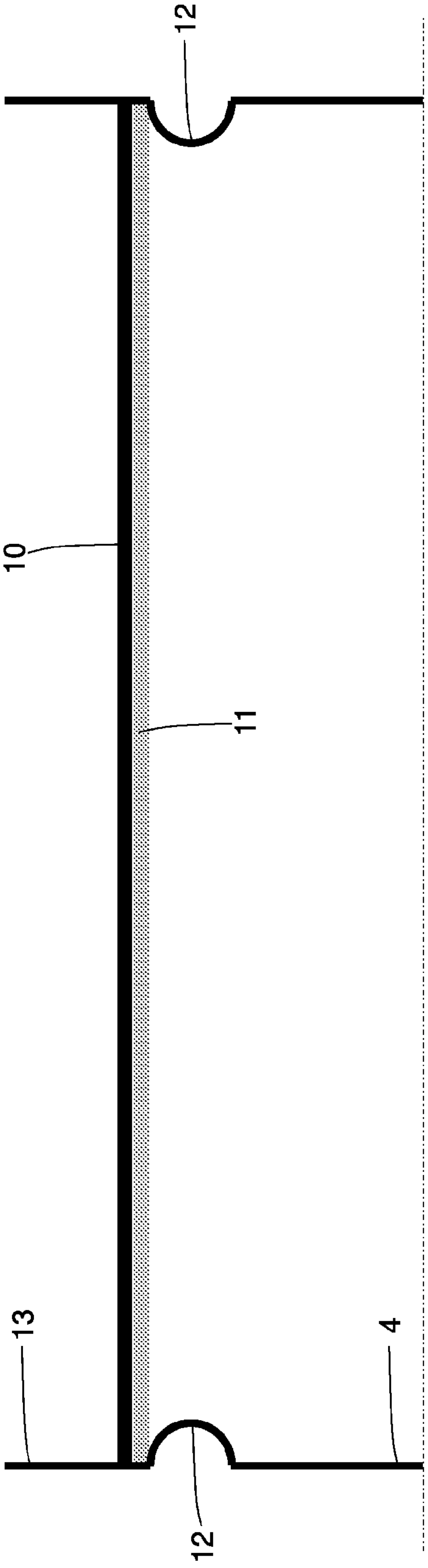

As illustrated in FIG. 6, the lid 10 is subsequently placed on the annular groove 12 (which constitutes a rest base and with the interposition of the gasket 11 previously arranged).

Alternatively, the lid 10 could be coupled beforehand to the gasket 11 and then the assembly of the lid 10 and of the gasket 11 is placed on the annular groove 12.

Figure 7:
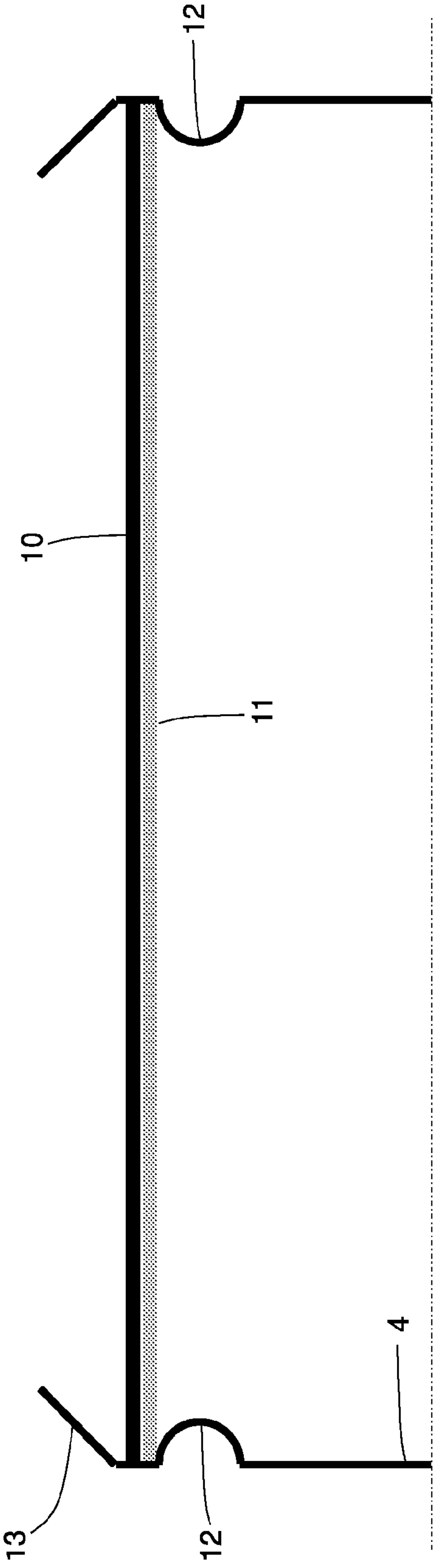
Figure 8:
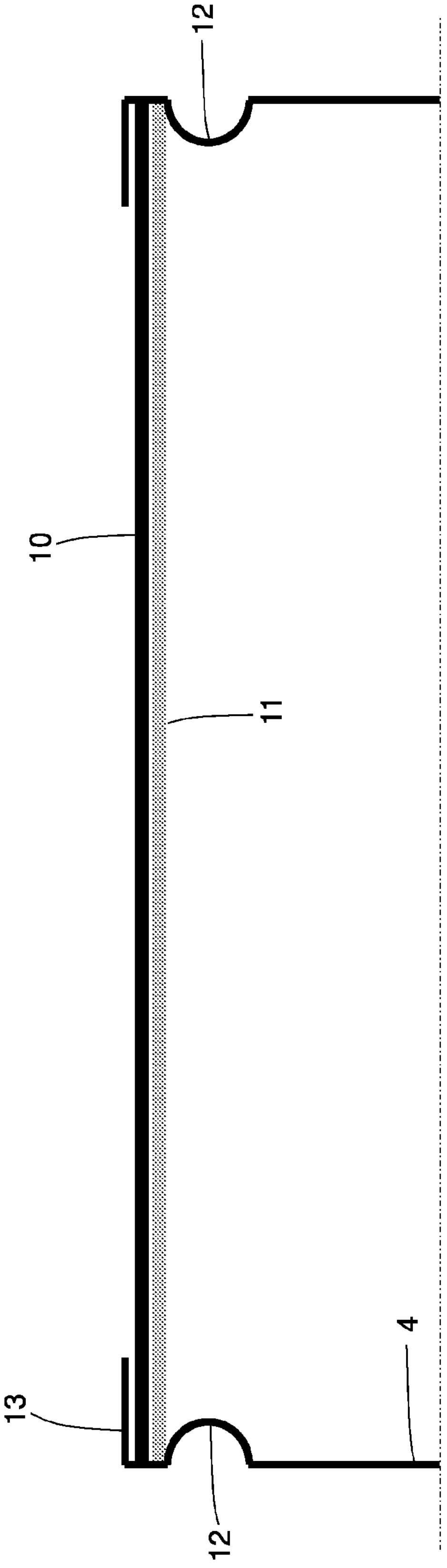

As illustrated in FIGS. 7 and 8, the rim 13 is subsequently bent against the assembly of the lid 10 and of the gasket 11 to clamp (hold) the assembly of the lid 10 and of the gasket 11 against the underlying groove 12. Preferably this operation is performed in two successive steps: initially, the rim 13 is bent by about 40-50° towards the assembly of the lid 10 and of the gasket 11 (as illustrated in FIG. 7) and only subsequently the rim 13 is bent further until it reaches a 90° bend against the assembly of the lid 10 and of the gasket 11 (as illustrated in FIG. 8).

The last operation that is performed is an axial compression of the entire cylindrical case 3 that causes an axial plastic deformation of the groove 12 and a compaction of the rim 13 against the lid 10.

Figure 9:
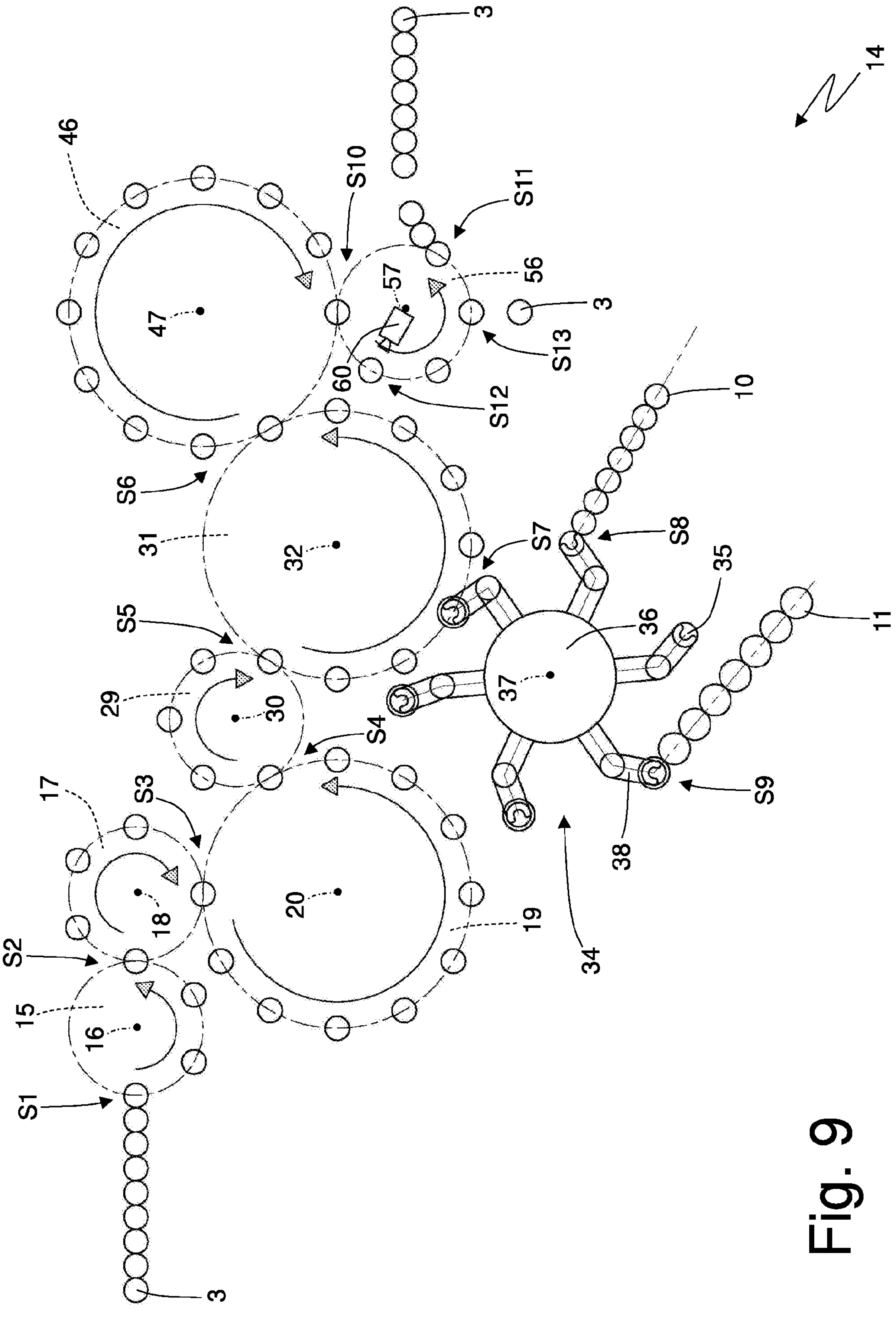
FIG. 9 is a schematic plan view of a manufacturing machine that creates the battery of FIG. 1 and in particular creates the upper closure of the cylindrical case of the cylindrical battery of FIG. 1.

In FIG. 9 number 14 denotes as a whole a manufacturing machine that produces the cylindrical battery 1 and in particular creates the upper closure of the cylindrical case 3 of the cylindrical battery 1.

The manufacturing machine 14 comprises a horizontal conveyor (not illustrated) that moves forward a series of cylindrical cases 3 containing the electrochemical cells 2 and that are open at the top along an entry path that ends in an exchange station S1.

The manufacturing machine 14 comprises a horizontal transfer drum 15 which is mounted so as to rotate around a vertical rotation axis 16 (perpendicular to the plane of the sheet), receives the cylindrical cases 3 in the exchange station S1, and hands over the cylindrical cases 3 in an exchange station S2.

The manufacturing machine 14 comprises a horizontal transfer drum 17 which is mounted so as to rotate around a vertical rotation axis 18 (parallel to the rotation axis 16), receives the cylindrical cases 3 in the exchange station S2, and hands over the cylindrical cases 3 in an exchange station S3.

Figure 10:
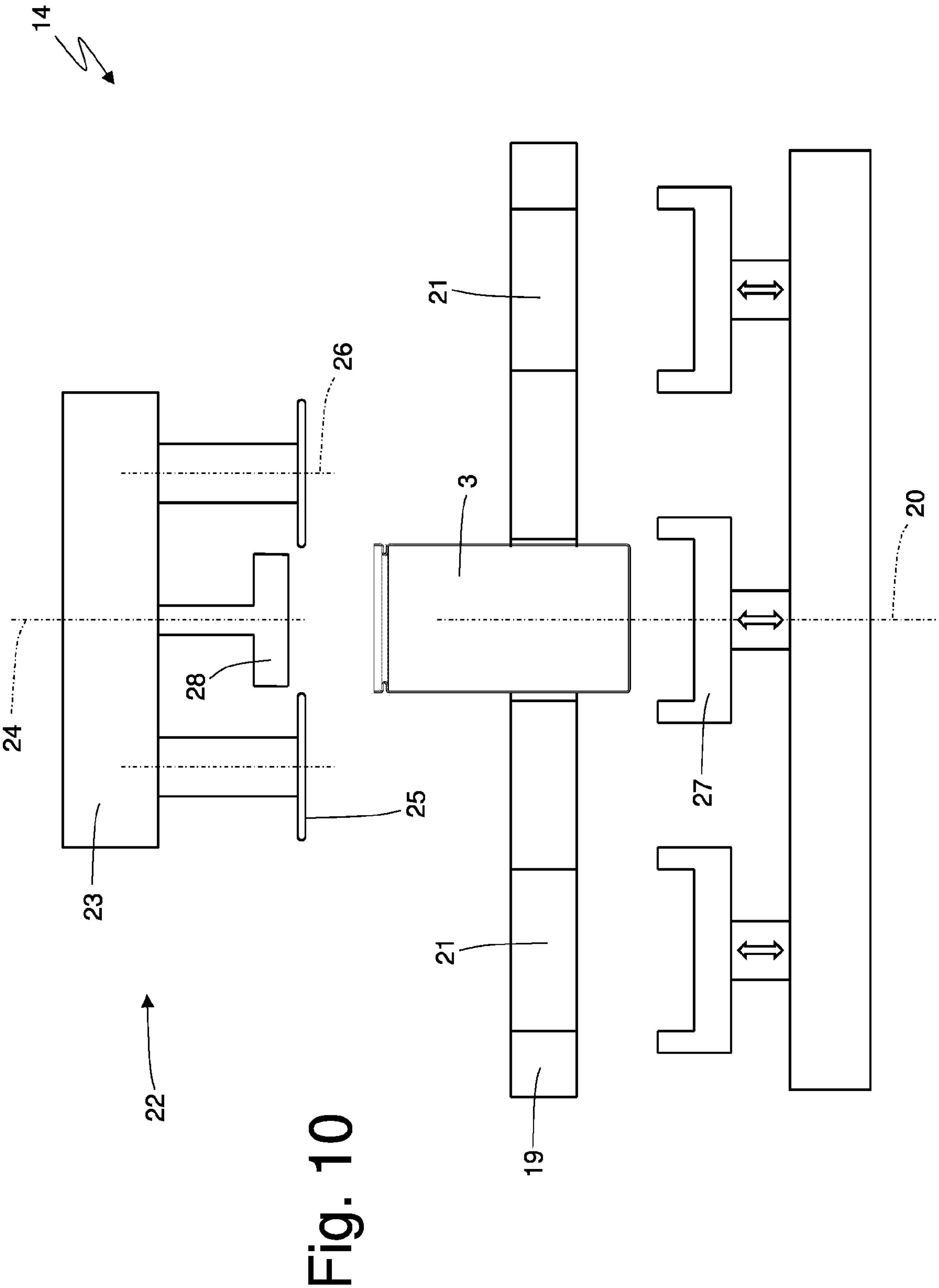
FIG. 10 is a schematic front view of a first processing drum provided with a deformation unit of the manufacturing machine of FIG. 9.

The manufacturing machine 14 comprises a horizontal processing drum 19 that is mounted so as to rotate around a vertical rotation axis 20 (parallel to the rotation axis 18), receives the cylindrical cases 3 in the exchange station S3 and hands over the cylindrical cases 3 in an exchange station S4. As illustrated in FIG. 10, the processing drum 19 supports a plurality (e.g. twelve) of seats 21 that are uniformly distributed along the periphery of the processing drum 19 and are moved forward by the rotation of the processing drum 19 about the rotation axis 20 along a circular processing path that extends between the exchange stations S3 and S4 (i.e. the processing path starts in the exchange station S3 and ends in the exchange station S4). Each seat 21 is designed to laterally grab a corresponding cylindrical case 3 (i.e. the seat 21 engages part of the side wall 4 of the cylindrical case 3) for example by holding the cylindrical case 3 by suction; in this way, the cylindrical case 3 can translate axially with respect to the corresponding seat 21 (according to the ways described below).

A corresponding deformation unit 22, which is carried by the processing drum 19 to move (rotate) integrally with the processing drum 19 itself, is coupled to each seat 21 of the processing drum 19. Each deformation unit 22 is configured to create the annular groove 12 on the side wall 4 of the cylindrical case 3 carried by the corresponding seat 21. In other words, there are as many deformation units 22 as the seats 21 and therefore each deformation unit 22 works always and only with a single corresponding seat 21. Each deformation unit 22 is arranged along the processing path defined by the processing drum 19 to create the annular groove 12 in a cylindrical case 3 that moves forward along the processing path supported by the corresponding seat 21. For the sake of simplicity, only three seats 21 and only one deformation unit 22 are illustrated in FIG. 10, but actually twelve seats 21 and twelve corresponding deformation units 22 are provided.

As illustrated in FIG. 10, each deformation unit 22 is mounted on the processing drum 19 to rotate integrally with the processing drum 19 itself and comprises a support body 23 which is axially aligned with the corresponding seat 21 and is mounted so as to rotate around a vertical rotation axis 24 which is parallel to the rotation axis 20. In other words, each support body 23 is coaxial to the corresponding seat 21 and rotates around its own central rotation axis 24 arranged sideways (at a certain distance) from the rotation axis 20 of the processing drum 19.

Each deformation unit 22 comprises a plurality (for example four, five or six) of deforming discs 25, which are designed to deform the side wall 4 of the cylindrical case 3 carried by the corresponding seat 21 in order to create the annular groove 12. In each deformation unit 22, the deforming discs 25 (all coplanar with each other, namely arranged at the same vertical height) are mounted on the support body 23 so as to form a circle at the centre of which the cylindrical case 3, in use, is placed and are radially movable so as to radially get close to and move away from the cylindrical case 3 which is, in use, between them. In particular, each deforming disc 25 is mounted on the support body 23 in a rotary manner so as to rotate around a vertical rotation axis 26 which is parallel to the rotation axis 24.

According to a preferred embodiment, each deforming disc 25 is mounted in an idle manner on the support body 23 so as to freely rotate (i.e. without constraints and without external actuations) around the rotation axis 26. Furthermore, according to a preferred embodiment, each deforming disc 25 is mounted in an eccentric manner relative the rotation axis 26 so as to radially move during its rotation around the rotation axis 26 itself; that is, the eccentricity of each deforming disc 25 causes a continuous radial translation of the deforming disc 25 during its rotation around the rotation axis 26 by cyclically getting the deforming disc 25 close to and away from the corresponding cylindrical case 3 arranged at the centre of the circle formed by the deforming discs 25.

For each seat 21 there is provided a corresponding lifting device 27 which is carried by the processing drum 19 so as to move (rotate) integrally with the processing drum 19 itself, is axially movable (i.e. along the rotation axis 26) and is configured to extract the cylindrical case 3 from the corresponding seat 21 by coupling the cylindrical case 3 to the corresponding deformation unit 22 (which is located above seat 21) and to insert the cylindrical case 3 again into the corresponding seat 21 by uncoupling the cylindrical case 3 from the deformation unit 22. In the middle of the support body 23 there is a central abutting element 28 which is integral with the drum 19 rotatingly and therefore does not rotate with the support body 23 and against which the cylindrical case 3 that is coupled to the deformation unit 22 is pushed; that is, the central abutting element 28 is stationary with respect to the processing drum 19 and therefore the support body 23 rotates around the central abutting element 28.

In use, a cylindrical case 3 is inserted into a seat 21 in the exchange station S3. Subsequently, while the processing drum 19 rotates around the rotation axis 20, the corresponding lifting device 27 removes the cylindrical case 3 from seat 21 with an upward axial movement by coupling the cylindrical case 3 to the corresponding deformation unit 22 that is located above the seat 21; in this position, the cylindrical case 3 is abutting against the central abutting element 28.

Once the cylindrical case 3 has been coupled to the deformation unit 22 by the lifting device 27, the support body 23 starts rotating around the rotation axis 24 and therefore the deforming discs 25 tend to rotate on the side wall 4 of the cylindrical case 3 (which remains stationary as it is pressed against the central abutting element 28); the radial movement of the deforming discs 25 caused by their eccentricity causes the deformation of the side wall 4 of the cylindrical case 3 and therefore forms the groove 12.

Subsequently, when the cylindrical case 3 arrives near the exchange station S4, the rotation of the support body 23 is stopped and the corresponding lifting device 27, with an axial downward movement, uncouples the cylindrical case 3 from the corresponding deformation unit 22 that is located above the seat 21 and brings the cylindrical case 3 back in the seat 21. At last, in the exchange station S4, the cylindrical case 3, which is now provided with the groove 12, leaves the corresponding seat 21 of the processing drum 19.

As illustrated in FIG. 9, the manufacturing machine 14 comprises a horizontal transfer drum 29 that is mounted so as to rotate around a vertical rotation axis 30 (parallel to the rotation axis 20), receives the cylindrical cases 3 in the exchange station S4 from the processing drum 19, and hands over the cylindrical cases 3 in an exchange station S5.

Figure 11:
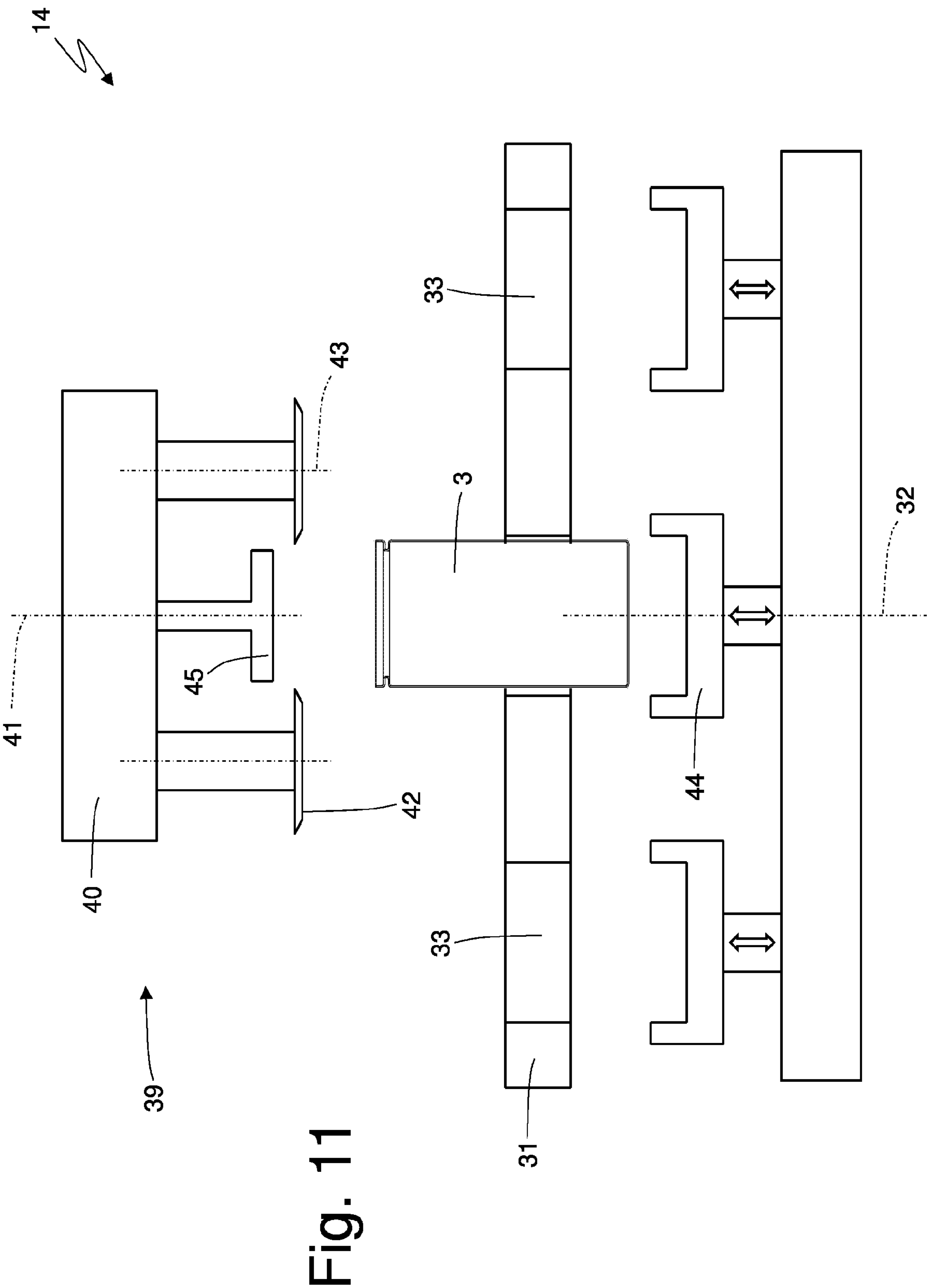
FIG. 11 is a schematic front view of a second processing drum provided with a first bending unit of the manufacturing machine of FIG. 9.

As illustrated in FIG. 9, the manufacturing machine 14 comprises a horizontal processing drum 31 that is mounted so as to rotate around a vertical rotation axis 32 (parallel to the rotation axis 30), receives the cylindrical cases 3 in the exchange station S5 from the transfer drum 29 and hands over the cylindrical cases 3 in an exchange station S6. As illustrated in FIG. 11, the processing drum 31 supports a plurality (e.g. twelve) of seats 33 that are uniformly distributed along the periphery of the processing drum 31 and are moved forward by the rotation of the processing drum 31 about the rotation axis 32 along a circular processing path that extends between the exchange stations S5 and S6 (i.e. the processing path starts in the exchange station S5 and ends at the exchange station S6). Each seat 33 is designed to laterally grab a corresponding cylindrical case 3 (i.e. the seat 33 engages part of the side wall 4 of the cylindrical case 3) for example by holding the cylindrical case 3 by suction; in this way, the cylindrical case 3 can translate axially with respect to the corresponding seat 33 (according to the methods described below).

As illustrated in FIG. 9, the manufacturing machine 14 comprises a feeding unit 34 which is configured to feed, in a feeding station S7 which is located between the exchange station S5 and the exchange station S6, on the upper end 8 of the cylindrical case 3 (i.e. above the cylindrical case 3) carried by each seat 33 an assembly consisting of a lid 10 and of a gasket 11 which are superimposed on each other.

Figure 12:
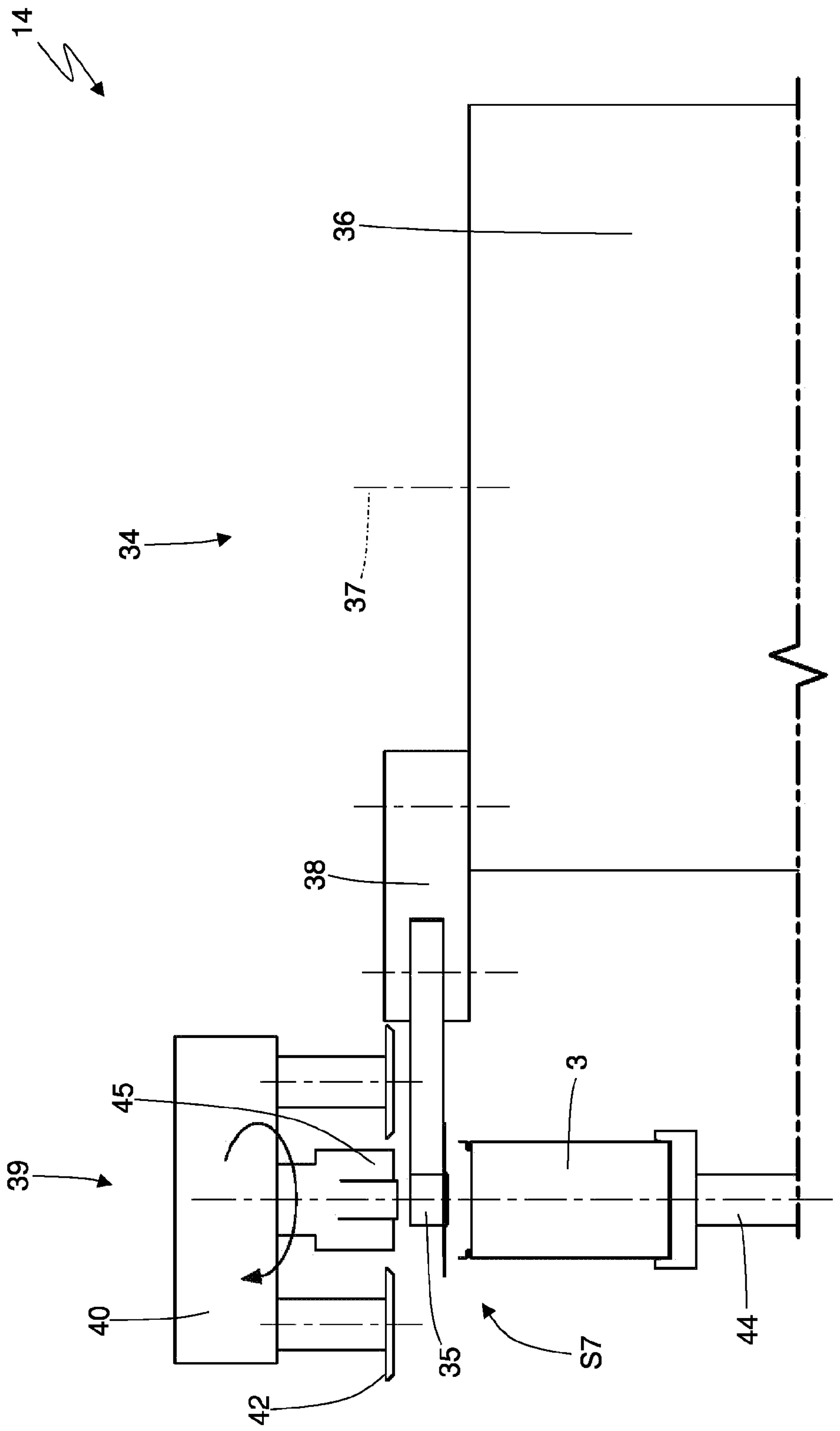
FIGS. 12 and 13 are two schematic front views of a feeding unit of the manufacturing machine of FIG. 9 in two different operating instants.
Figure 13:
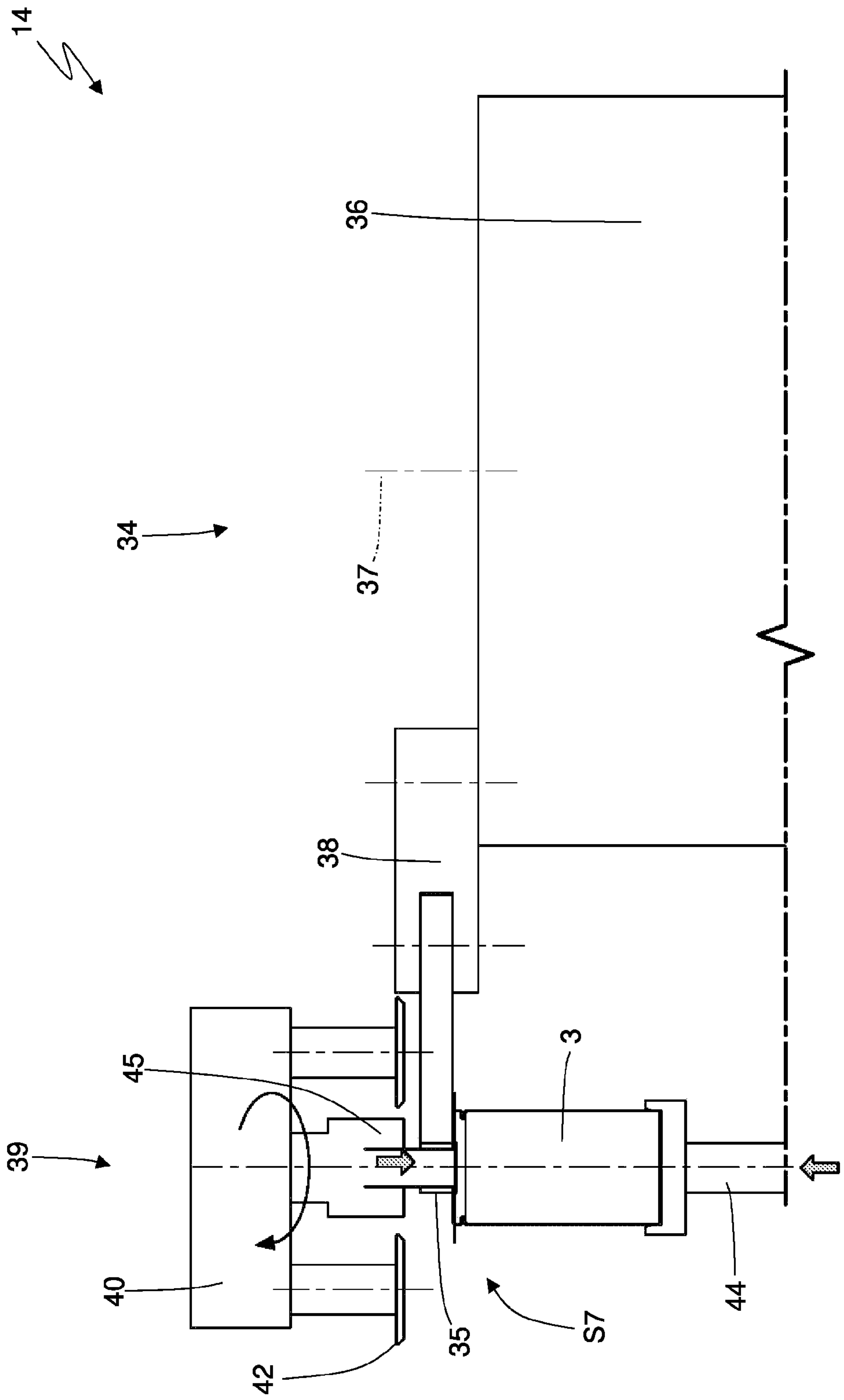

As illustrated in FIGS. 9, 12 and 13, the feeding unit 34 comprises a plurality (e.g. six) of sucking holding heads 35, each of which is designed to hold an assembly consisting of a lid 10 and of a gasket 11 which are superimposed on each other. In addition, the feeding unit 34 comprises a feeding drum 36 which is arranged beside the processing drum 31, is mounted so as to rotate around a vertical rotation axis 37 (parallel to the rotation axis 32), and supports the holding heads 35 with the interposition of corresponding hinged arms 38. Preferably, each hinged arm 38 has a joint centrally and therefore has two degrees of freedom.

The rotation of the feeding drum 36 about the rotation axis 37 carries each holding head 35 through a picking station S8 in which the holding head 35 picks up a lid 10, then through a picking station S9 in which the holding head 35 picks up a gasket 11 that overlaps the previously picked up lid 10, and finally through the feeding station S7 in which the assembly consisting of a lid 10 and of a gasket 11 superimposed on each other is released onto a cylindrical case 3 (as illustrated in FIGS. 12 and 13).

As illustrated in FIG. 11, a corresponding bending unit 39 which is carried by the processing drum 31 to move (rotate) integrally with the processing drum 31 itself is coupled to each seat 33 of the processing drum 31. Each bending unit 39 is configured to make a first (partial) bending of the rim 13 of the cylindrical case 3 carried by the corresponding seat 33 downstream of the feeding station S7 (i.e. after the feeding of the lid 10 and the gasket 11). In other words, there are as many bending units 39 as the seats 33 and therefore each bending unit 39 works always and only with a single corresponding seat 33. Each bending unit 39 is arranged along the processing path defined by the processing drum 31 so as to create a partial bending (illustrated in FIG. 7) of the rim 13 in a cylindrical case 3 that moves along the processing path supported by the corresponding seat 33. For sake of simplicity, only three seats 33 and only one bending unit 39 are illustrated in FIG. 11, but actually twelve seats 33 and twelve corresponding bending units 39 are provided.

As illustrated in FIG. 11, each bending unit 39 is mounted on the processing drum 31 to rotate integrally with the processing drum 31 itself and comprises a support body 40 which is axially aligned with the corresponding seat 33 and is mounted so as to rotate around a vertical rotation axis 41 which is parallel to the rotation axis 32. In other words, each support body 40 is coaxial to the corresponding seat 33 and rotates around its own central rotation axis 41 arranged sideways (at a certain distance) from the rotation axis 32 of the processing drum 31.

Each bending unit 39 comprises a plurality (for example four, five or six) of bending discs 42, which are designed to bend the rim 13 of the side wall 4 of the cylindrical case 3 carried by the corresponding seat 33. In each bending unit 39, the bending discs 42 (all coplanar with each other, namely arranged at the same vertical height) are mounted on the support body 40 so as to form a circle at the centre of which the cylindrical case 3, in use, is placed and are radially movable so as to radially get close to and move away from the cylindrical case 3 which is located, in use, between them. In particular, each bending disc 42 is mounted on the support body 40 in a rotary manner so as to rotate around a vertical rotation axis 43 which is parallel to the rotation axis 41.

According to a preferred embodiment, each bending disc 42 is mounted in an idle manner on the support body 40 so as to freely rotate (i.e. without constraints and without external actuations) about the rotation axis 43. Furthermore, according to a preferred embodiment, each bending disc 42 is mounted in an eccentric manner relative the rotation axis 43 so as to radially move during its rotation around the rotation axis 43 itself; that is, the eccentricity of each bending disc 42 causes a continuous radial translation of the bending disc 42 during its rotation around the rotation axis 43 cyclically getting the bending disc 42 close to and away from the corresponding cylindrical case 3 arranged at the centre of the circle formed by the bending discs 42.

For each seat 33 there is provided a corresponding lifting device 44 which is carried by the processing drum 31 to move (rotate) integrally with the processing drum 31 itself, is axially movable (i.e. along the rotation axis 43) and is configured to extract the cylindrical case 3 from the corresponding seat 33 by coupling the cylindrical case 3 to the corresponding bending unit 39 (which is located above the seat 33) and to insert the cylindrical case 3 again into the corresponding seat 33 by uncoupling the cylindrical case 3 from the bending unit 39. In the middle of the support body 40 there is a central abutting element 45 which is integral with the drum 31 rotatingly and therefore does not rotate with the support body 40 and against which the cylindrical case 3 that is coupled to the bending unit 39 is pushed; that is, the central abutting element 45 is stationary with respect to the processing drum 31 and therefore the support body 40 rotates around the central abutting element 45.

According to a possible embodiment illustrated in FIGS. 12 and 13, the abutting element 45 of each bending unit 39 has a vertically movable pusher that travels a processing stroke (from top to bottom) to transfer the assembly consisting of a lid 10 and of a gasket 11 from the corresponding holding head 35 to the upper end 8 of the underlying cylindrical case 3 (for this purpose each holding head 35 has a through hole into which the pusher is inserted). In use, a cylindrical case 3 is inserted into a seat 33 in the exchange station S5. Subsequently, while the processing drum 31 rotates around the rotation axis 32, the seat 33 passes through the feeding station S7 in which the assembly consisting of a lid 10 and of a gasket 11 superimposed on each other is placed on top of the cylindrical case 3. Subsequently, while the processing drum 31 rotates around the rotation axis 32, the corresponding lifting device 44 with an upward axial movement removes the cylindrical case 3 from seat 33 by coupling the cylindrical case 3 to the corresponding bending unit 39 that is located above the seat 33; in this position, the cylindrical case 3 is abutting against the central abutting element 45. Once the cylindrical case 3 has been coupled to the bending unit 39 by the lifting device 44, the support body 40 starts rotating around the rotation axis 41 and therefore the bending discs 42 tend to rotate on the side wall 4 of the cylindrical case 3 (which remains stationary as it is pressed against the central abutting element 45); the radial movement of the bending discs 42 caused by their eccentricity causes the partial bending of the rim of the cylindrical case 3 (as illustrated in FIG. 7).

Subsequently, when the cylindrical case 3 arrives near the exchange station S6, the rotation of the support body 40 is stopped and the corresponding lifting device 44 with an axial downward movement uncouples the cylindrical case 3 from the corresponding bending unit 39 that is located above the seat 33 and brings the cylindrical case 3 back in the seat 33.

At last, in the exchange station S6 the cylindrical case 3, which is now provided with the lid 10 and the gasket 11, leaves the corresponding seat 33 of the processing drum 31.

As illustrated in FIG. 9, the manufacturing machine 14 comprises a horizontal processing drum 46 that is mounted so as to rotate around a vertical rotation axis 47 (parallel to the rotation axis 32), receives the cylindrical cases 3 in the exchange station S6 from the processing drum 31 and hands over the cylindrical cases 3 in an exchange station S10. That is, the processing drum 31 is configured to directly transfer each cylindrical case 3 to the processing drum 46 at the exchange station S6.

Figure 14:
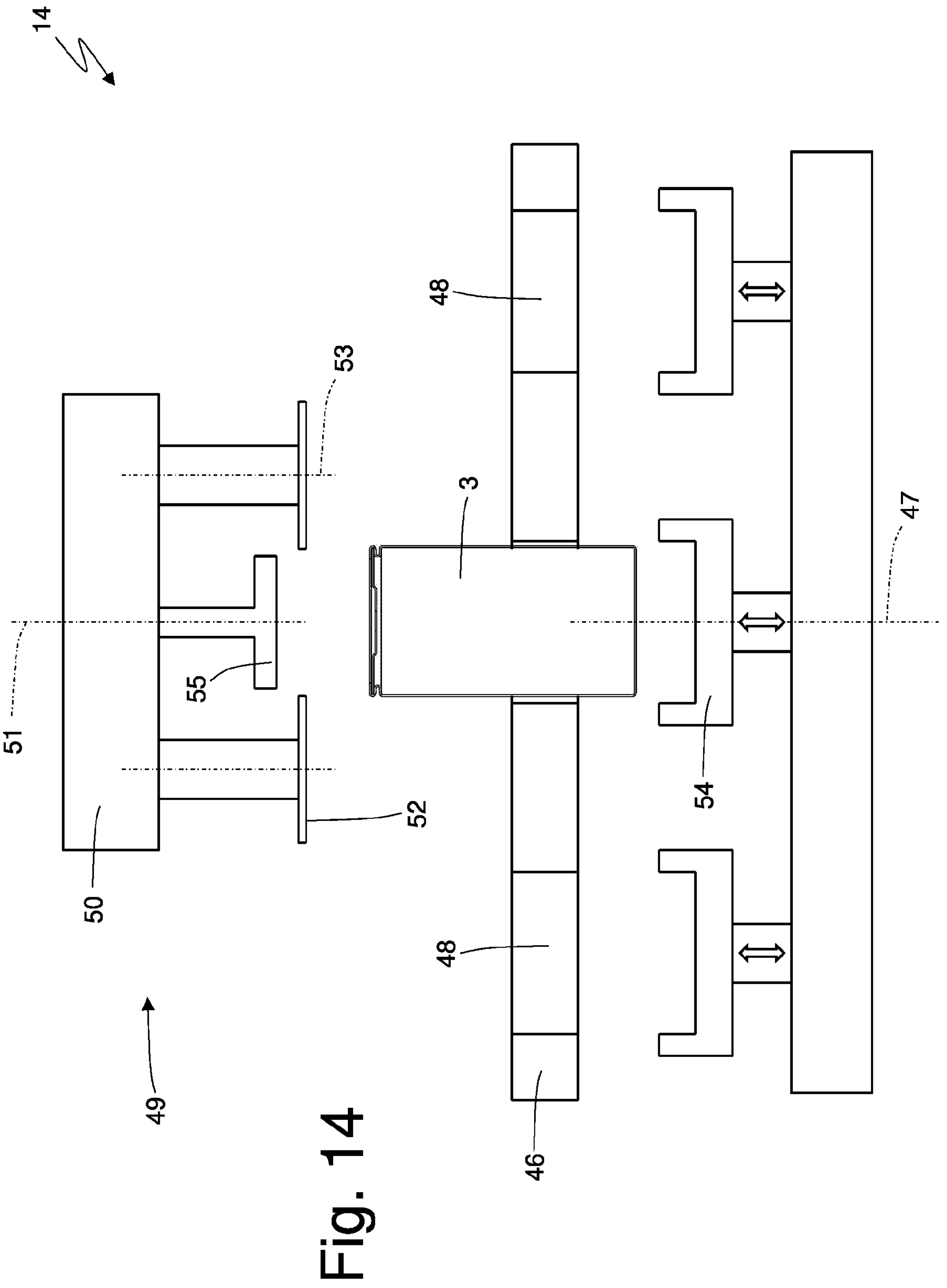
FIG. 14 is a schematic front view of a third processing drum provided with a second bending unit of the manufacturing machine of FIG. 9.

As illustrated in FIG. 14, the processing drum 46 supports a plurality (e.g., twelve) of seats 48 that are uniformly distributed along the periphery of the processing drum 46 and are moved forward by the rotation of the processing drum 46 around the rotation axis 47 along a circular processing path that extends between the exchange stations S6 and S10 (i.e., the processing path begins in the exchange station S6 and ends in the exchange station S10).

Each seat 48 is designed to laterally grab a corresponding cylindrical case 3 (i.e. the seat 48 engages part of the side wall 4 of the cylindrical case 3) for example by holding the cylindrical case 3 by suction; in this way, the cylindrical case 3 can translate axially with respect to the corresponding seat 48 (according to the ways described below).

As illustrated in FIG. 14, a corresponding bending unit 49 which is carried by the processing drum 46 to move (rotate) integrally with the processing drum 46 itself is coupled to each seat 48 of the processing drum 46. Each bending unit 49 is configured to create a second (end) bending of the rim 13 of the cylindrical case 3 carried by the corresponding seat 48 to complete the bending of the rim 13 (as illustrated in FIG. 8). In other words, there are as many bending units 49 as the seats 48 and therefore each bending unit 49 works always and only with a single corresponding seat 48. Each bending unit 49 is arranged along the processing path defined by the processing drum 46 to complete the bending of the rim 13 in a cylindrical case 3 that moves forward along the processing path supported by the corresponding seat 48. For sake of simplicity, only three seats 48 and only one bending unit 49 are illustrated in FIG. 14, but actually twelve seats 48 and twelve corresponding bending units 49 are provided.

As illustrated in FIG. 14, each bending unit 49 is mounted on the processing drum 46 to rotate integrally with the processing drum 46 itself and comprises a support body 50 which is axially aligned with the corresponding seat 48 and is mounted so as to rotate around a vertical rotation axis 51 parallel to the rotation axis 47. In other words, each support body 50 is coaxial to the corresponding seat 48 and rotates around its own central rotation axis 51 arranged sideways (at a certain distance) from the rotation axis 47 of the processing drum 46.

Each bending unit 49 comprises a plurality (for example four, five or six) of bending discs 52, which are designed to bend the rim 13 of the side wall 4 of the cylindrical case 3 carried by the corresponding seat 48. In each bending unit 49, the bending discs 52 (all coplanar with each other, namely arranged at the same vertical height) are mounted on the support body 50 so as to form a circle at the centre of which the cylindrical case 3, in use, is placed, and are radially movable so as to radially get close to and move away from the cylindrical case 3 which is, in use, between them. In particular, each bending disc 52 is mounted on the support body 50 in a rotary manner so as to rotate around a vertical rotation axis 53 which is parallel to the rotation axis 51.

According to a preferred embodiment, each bending disc 52 is mounted in an idle manner on the support body 50 so as to freely rotate (i.e. without constraints and without external actuations) about the rotation axis 53. Furthermore, according to a preferred embodiment, each bending disc 52 is mounted in an eccentric manner relative the rotation axis 53 so as to radially move during its rotation around the rotation axis 53 itself; that is, the eccentricity of each bending disc 52 causes a continuous radial translation of the bending disc 52 during its rotation around the rotation axis 53 by cyclically getting the bending disc 52 close to and away from the corresponding cylindrical case 3 arranged at the centre of the circle formed by the bending discs 52.

For each seat 48 there is provided a corresponding lifting device 54 which is carried by the processing drum 46 to move (rotate) integrally with the processing drum 46 itself, is axially movable (i.e. along the rotation axis 53) and is configured to extract the cylindrical case 3 from the corresponding seat 48 by coupling the cylindrical case 3 to the corresponding bending unit 49 (which is located above the seat 48) and to insert the cylindrical case 3 again into the corresponding seat 48 by uncoupling the cylindrical case 3 from the bending unit 49. In the middle of the support body 50 there is a central abutting element 55 that is integral with the drum 46 rotatingly and therefore does not rotate with the support body 50 and against which the cylindrical case 3 that is coupled to the bending unit 49 is pushed; that is, the central abutting element 55 is stationary with respect to the processing drum 46 and hence the support body 50 rotates around the central abutting element 55.

In use, a cylindrical case 3 is inserted into a seat 48 in the exchange station S6. Subsequently, while the processing drum 46 rotates around the rotation axis 47, the corresponding lifting device 54 removes the cylindrical case 3 from the seat 48 with an upward axial movement by coupling the cylindrical case 3 to the corresponding bending unit 49 that is located above the seat 48; in this position, the cylindrical case 3 is abutting against the central abutting element 55.

Figure 15:
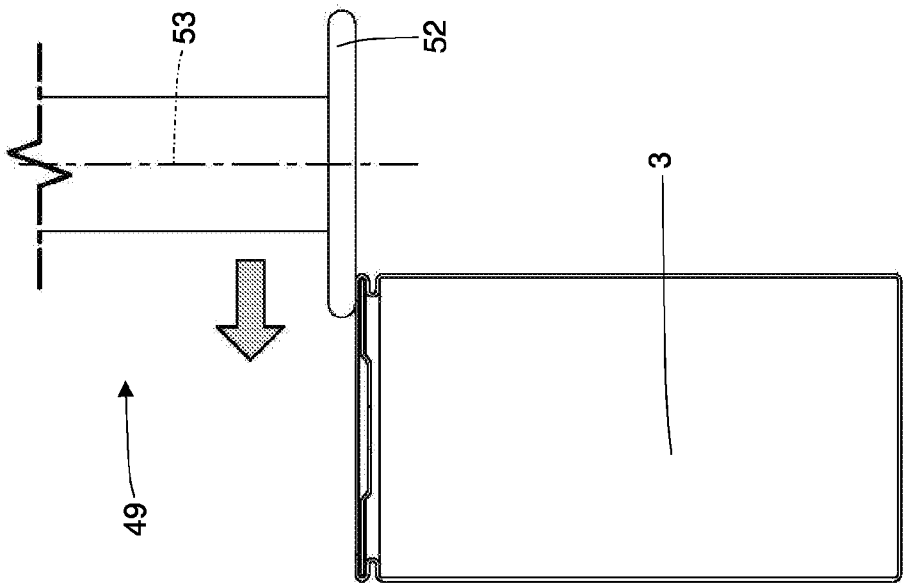
FIG. 15 is a schematic front and schematic view of a detail of the second bending unit of FIG. 14.

Once the cylindrical case 3 has been coupled to the bending unit 49 by the lifting device 54, the support body 50 starts rotating around the rotation axis 51 and therefore the bending discs 52 tend to rotate on the side wall 4 of the cylindrical case 3 (which remains stationary as it is pressed against the central abutting element 55); the radial movement of the bending discs 52 caused by their eccentricity causes the bending of the rim of the cylindrical case 3 (as illustrated in FIG. 8 and also in FIG. 15).

Subsequently, when the cylindrical case 3 arrives near the exchange station S10, the rotation of the support body 50 is stopped and the corresponding lifting device 54 with an axial downward movement uncouples the cylindrical case 3 from the corresponding bending unit 49 that is located above the seat 48 and brings the cylindrical case 3 back in the seat 48.

At last, in the exchange station S10 the cylindrical case 3 leaves the corresponding seat 48 of the processing drum 46.

As illustrated in FIG. 9, the manufacturing machine 14 comprises a horizontal transfer drum 56 that is mounted so as to rotate around a vertical rotation axis 57 (parallel to the rotation axis 47), receives the cylindrical cases 3 in the exchange station S10, and hands over the cylindrical cases 3 in an exchange station S11.

As illustrated in FIG. 9, the manufacturing machine 14 comprises a horizontal conveyor (not illustrated) that moves a series of cylindrical cases 3 containing the electrochemical cells and closed at the top along an outlet path that begins in the exchange station S11.

Figure 16:
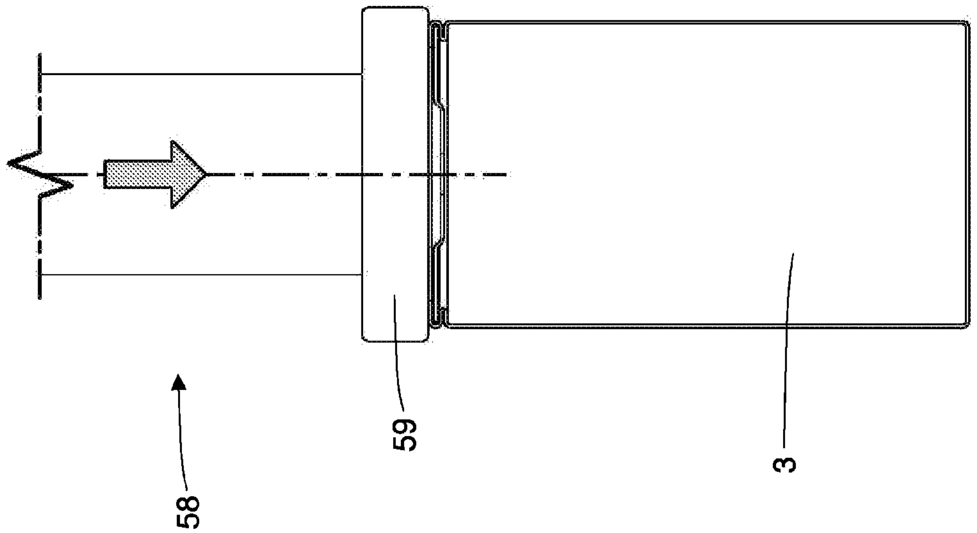
FIG. 16 is a schematic front and schematic view of a compression unit of the manufacturing machine of FIG. 9.

As illustrated in FIG. 16, the manufacturing machine 14 comprises a plurality of compression units 58 (only one of which is illustrated in FIG. 16) which are arranged (at least functionally) downstream of the bending units 49. Each compression unit 58 is configured to axially compress a corresponding cylindrical case 3 so as to plastically deform the groove 12 creating a compaction of the entire upper end 8 of the cylindrical case 3 itself (as is apparent by comparing FIG. 8 showing a cylindrical case 3 before axial compression and FIG. 2 showing a cylindrical case 3 after axial compression). In particular, each compression unit 58 comprises a hammer 59 that is axially movable to apply an axial compression to a corresponding cylindrical case 3.

According to a possible embodiment, a further (fourth) processing drum is provided which is interposed between the processing drum 46 and the transfer drum 56, rotates around a vertical rotation axis, is provided with a series of seats each designed to receive a cylindrical case 3, and is provided with a series of compression units 58 which cooperate with the seats. According to an alternative embodiment, the compression units 58 are integrated together with the bending units 49 in the processing drum 46 for example by replacing the abutting elements 55 of the bending units 49 with the movable hammers 59 of the compression units 58: firstly (in the initial part of the processing path) the bending units 49 act so as to complete the bending of the rim 13 of the cylindrical cases 3 and then (in the final part of the processing path) the compression units 58 act so as to axially compress the cylindrical cases 3.

According to a further embodiment, the compression units 58 replace the bending units 49 in the processing drum 46 and thus become bending and compression units 58: for each bending and compression unit 58 a first (initial) part of the stroke of the hammer 59 completes the bending of the rim 13 of a corresponding cylindrical case 3, while a second (final) part of the stroke of the hammer 59 axially compresses the corresponding cylindrical case 3.

According to a further embodiment, the bending units 49 of the processing drum 46 replace the compression units 58 and thus become bending and compression units 49: for each bending and compression unit 49 initially the bending discs 52 complete the bending of the rim 13 of a corresponding cylindrical case 3 and subsequently the corresponding lifting device 54 travels a further (small) upward stroke to axially crush (compress) the upper end 8 of the corresponding cylindrical case 3 against the bending discs 52.

As illustrated in FIG. 9, near the transfer drum 56 there is a control station S12 in which an optical control device 60 checks whether the upper end 8 of each cylindrical case 3 matches to the desired specifications; furthermore, near the transfer drum 56 there is a waste station S13 (obviously downstream of the control station S12) in which a cylindrical case 3 which is not compliant with the desired specifications (i.e. defective) is discarded by being extracted from the transfer drum 56 and being then directed towards a waste collection path. According to a preferred embodiment, the manufacturing machine 14 is a continuous type machine, i.e. it operates using a continuous type law of motion that provides that the conveyors do not cyclically alternate stop steps and motion steps and instead have a constant feed rate (which obviously increases or decreases as the hourly productivity with which the manufacturing machine 14 operates increases or decreases). Accordingly, all processing drums 19, 31 and 46 rotate with a continuous law of motion around the corresponding rotation axes 20, 33 and 47.

According to a different embodiment not illustrated, the bending units 39 coupled to the processing drum 31 are not provided and the bending of the rim 13 of each cylindrical case 3 is performed in a single step (instead of the two subsequent steps) by the bending units 49 coupled to the processing drum 46.

It is important to note that the deformation units 22, the bending units 39 and the bending units 49 are structurally identical and differ from each other only in the type of operating tools installed (i.e. the deforming discs 25 are shaped differently from the bending discs 42 and 52, and also the bending discs 42 and 52 are shaped differently from each other); consequently, the processing drums 19, 31 and 46 are also structurally identical from each other. In this way, a single complex object is designed and built which is replicated several times (in a sort of "copy & paste") in order to constitute all three processing drums 19, 31 and 46 and all units 22, 39 and 49.

The embodiments described herein may be combined with each other without departing from the scope of protection of the present invention.

The manufacturing machine 14 described above has numerous advantages.

Firstly, the manufacturing machine 14 described above allows to operate at a high production rate (i.e. with a high number of cylindrical cases 3 produced in the unit of time) without damaging the cylindrical cases 3 themselves.

The manufacturing machine 14 described above is particularly compact and has optimal accessibility to all its components for adjustment, format change, maintenance and repair measures.

The manufacturing machine 14 described above allows to change the format of the cylindrical cases 3 in a relatively simple and fast way.

Finally, the manufacturing machine 14 described above also presents a reduced construction complication and production cost as it replicates the same type of structure several times.

LIST OF REFERENCE NUMBERS OF THE FIGURES

1 cylindrical battery
2 electrochemical cell
3 cylindrical case
4 side wall
5 lower end
6 lower wall
7 negative pole
8 upper end
10 lid
11 gasket
12 groove
13 rim
14 manufacturing machine
15 transfer drum
16 rotation axis
17 transfer drum
18 rotation axis
19 processing drum
rotation axis
21 seats
22 deformation unit
23 support body
24 rotation axis
25 deforming discs
26 rotation axis
27 lifting device
28 abutting element
29 transfer drum
30 rotation axis
31 processing drum
32 rotation axis
33 seats
34 feeding unit
35 holding head
36 feeding drum
37 rotation axis
38 hinged arm
39 bending unit
40 support body
41 rotation axis
42 bending discs
43 rotation axis
44 lifting device
45 abutting element
46 processing drum
47 rotation axis
48 seats
49 bending unit
50 support body
51 rotation axis
52 bending discs
53 rotation axis
54 lifting device
55 abutting element
56 transfer drum
57 rotation axis
58 compression unit
59 hammer
60 control device
S1 exchange station
S2 exchange station
S3 exchange station
S4 exchange station
S5 exchange station
S6 exchange station
S7 feeding station
S8 picking station
S9 picking station
S10 exchange station
S11 exchange station
S12 control station
S13 waste station

The invention claimed is:

1. A manufacturing machine to manufacture a cylindrical battery comprising a cylindrical case, which houses an electrochemical cell and is closed, at the top, by a lid; wherein the manufacturing machine comprises:
   - a first processing drum, which is mounted so as to rotate around a first rotation axis in order to move forward, along a first processing path, a first seat designed to support the cylindrical case;
   - a deformation unit, which is arranged along the first processing path and is configured to create an annular groove on a side wall of the cylindrical case;
   - a second processing drum, which is arranged downstream of the first processing drum and is mounted so as to rotate around a second rotation axis in order to move forward, along a second processing path, a second seat designed to support the cylindrical case;

a feeding unit, which is configured to feed the lid on top of the cylindrical case supported by the second seat;

a third processing drum, which is arranged downstream of the second processing drum and is mounted so as to rotate around a third rotation axis in order to move forward, along a third processing path, a third seat designed to support the cylindrical case; and a first bending unit, which is arranged along the third processing path and is configured to bend a rim of the cylindrical case against the lid.

2. The manufacturing machine according to claim 1, comprising a second bending unit, which is arranged along the second processing path and is configured to only partially bend the rim of the cylindrical case towards the lid.

3. The manufacturing machine according to claim 1, comprising a compression unit, which is arranged downstream of the first bending unit and is configured to axially compress the cylindrical case so as to plastically deform the groove.

4. The manufacturing machine according to claim 1, wherein the feeding unit is configured to feed, together, the lid and a gasket on top of the cylindrical case supported by the second seat.

5. The manufacturing machine-according to claim 1, wherein the feeding unit comprises:

a holding head, which is designed to hold the lid;

a feeding drum, which is arranged beside the second processing drum, is mounted so as to rotate around a fourth rotation axis and supports the holding head with the interposition of a hinged arm.

6. The manufacturing machine according to claim 1, comprising a transfer drum, which is mounted so as to rotate around a fifth rotation axis, is interposed between the first processing drum and the second processing drum and is configured to transfer the cylindrical case from the first processing drum to the second processing drum.

7. The manufacturing machine according to claim 1, wherein the deformation unit is configured to rotate together with the first processing drum in an integral manner.

8. The manufacturing machine according to claim 1, wherein the deformation unit comprises:

a first support body, which is axially aligned with the first seat and is mounted so as to rotate around a sixth rotation axis, which is parallel to the first rotation axis; and a plurality of deforming discs, which are designed to deform the side wall of the cylindrical case in order to create the annular groove, are mounted on the first support body so as to form a circle at the centre of which the cylindrical case, in use, is placed, and are radially movable so as to radially get close to and move away from the cylindrical case which is, in use, between them.

9. The manufacturing machine according to claim 8, wherein each deforming disc of the plurality of deforming discs is mounted on the first support body in a rotary manner so as to rotate around a seventh rotation axis, which is parallel to the sixth rotation axis.

10. The manufacturing machine according to claim 8, wherein each deforming disc of the plurality of deforming discs is mounted on the first support body in a rotary manner about a seventh rotation axis, which is parallel to the sixth rotation axis, in an idle manner so as to freely rotate around the seventh rotation axis.

11. The manufacturing machine according to claim 8, wherein each deforming disc of the plurality of deforming discs is mounted on the first support body in a rotary manner about a seventh rotation axis, wherein each deforming disc is mounted in an eccentric manner relative to the seventh rotation axis so as to radially move during its rotation around the seventh rotation axis.

12. The manufacturing machine according to claim 1, comprising a first lifting device, which is axially movable and is configured to extract the cylindrical case from the first seat by coupling the cylindrical case to the deformation unit and to insert the cylindrical case again into the first seat by uncoupling the cylindrical case from the deformation unit.

13. The manufacturing machine according to claim 1, wherein in the middle of the first support body there is a first central abutting element, which is integral to the first processing drum and, hence, does not rotate with the first support body and against which the cylindrical case that is coupled to the deformation unit, is pushed.

14. The manufacturing machine according to claim 1, wherein the first and the second bending unit is mounted on a corresponding processing drum so as to rotate together with the corresponding processing drum in an integral manner.

15. The manufacturing machine according to claim 14, wherein each of the first and second bending unit comprises:

a second support body, which is axially aligned with the corresponding seat and is mounted so as to rotate around an eighth rotation axis, which is parallel to the rotation axis of the corresponding processing drum; and a plurality of bending discs, which are designed to bend the rim of the side wall of the cylindrical case, are mounted on the second support body so as to form a circle at the centre of which the cylindrical case, in use, is placed, and are radially movable so as to radially get close to and move away from the cylindrical case which is arranged, in use, between them.

16. The manufacturing machine according to claim 1, wherein each of the first and second bending unit is mounted on a corresponding processing drum so as to rotate together with the corresponding processing drum in an integral manner the machine comprising:

a second support body, which is axially aligned with the corresponding seat and is mounted so as to rotate around an eighth rotation axis, which is parallel to the rotation axis of the corresponding processing drum; and a plurality of bending discs, which are designed to bend the rim of the side wall of the cylindrical case, are mounted on the second support body so as to form a circle at the centre of which the cylindrical case, in use, is placed, and are radially movable so as to radially get close to and move away from the cylindrical case which is arranged, in use, between them, wherein the bending disc is mounted on the second support body in a rotary manner so as to rotate around a ninth rotation axis which is parallel to the eighth rotation axis.

17. The manufacturing machine according to claim 16, wherein each bending disc is mounted in an idle manner so as to freely rotate around the ninth rotation axis.

18. The manufacturing machine according to claim 15, wherein each bending disc is mounted in an eccentric manner relative to the ninth rotation axis so as to radially move during its rotation around the ninth rotation axis.

19. The manufacturing machine according to claim 14, comprising a second lifting device, which is axially movable and is configured to extract the cylindrical case from the corresponding seat by coupling the cylindrical case to the bending unit and to insert the cylindrical case again into the corresponding seat by uncoupling the cylindrical case from the corresponding bending unit.

20. The manufacturing machine according to claim 14, wherein in the middle of the second support body there is a second central abutting element, which is integral to the corresponding processing drum and does not rotate with the second support body and against which the cylindrical case that is coupled to the bending unit is pushed.

* * * * *